(12) United States Patent
Tutaj et al.

(10) Patent No.: US 9,366,155 B2
(45) Date of Patent: Jun. 14, 2016

(54) BLADE WITH REDUNDANT ANCHORING IN A HUB, PROPELLER, TURBOPROP ENGINE AND AIRCRAFT

(71) Applicant: RATIER FIGEAC, Figeac (FR)

(72) Inventors: Stanislas Tutaj, Faycelles (FR); Bruno Petellaz, Beduer (FR); Pascal Amat, Figeac (FR)

(73) Assignee: RATIER FIGEAC, Figeac (FR)

( * ) Notice: Subject to any disclaimer, the term of this patent is extended or adjusted under 35 U.S.C. 154(b) by 805 days.

(21) Appl. No.: 13/721,706

(22) Filed: Dec. 20, 2012

(65) Prior Publication Data

US 2015/0176426 A1 Jun. 25, 2015

(30) Foreign Application Priority Data

Dec. 23, 2011 (FR) ...................................... 11 04087

(51) Int. Cl.
*F01D 21/04* (2006.01)
*F01D 5/30* (2006.01)
*B64C 11/04* (2006.01)

(52) U.S. Cl.
CPC .............. *F01D 21/045* (2013.01); *B64C 11/04* (2013.01); *F01D 5/30* (2013.01); *Y02T 50/672* (2013.01)

(58) Field of Classification Search
CPC ........ F01D 21/045; F01D 5/30; F01D 5/3007; F01D 5/3023; F01D 5/3053; B64C 11/04; B64C 27/48; F04D 29/322
See application file for complete search history.

(56) References Cited

U.S. PATENT DOCUMENTS

| | | | | |
|---|---|---|---|---|
| 3,734,642 A | * | 5/1973 | Dixon | B64C 27/48 416/204 R |
| 3,942,910 A | * | 3/1976 | Snyder | B64C 27/32 416/135 |
| 4,373,862 A | * | 2/1983 | Ferris | B64C 27/006 116/264 |
| 4,685,864 A | | 8/1987 | Angus et al. | |
| 4,966,527 A | * | 10/1990 | Merz | B29C 70/202 416/230 |
| 5,129,787 A | | 7/1992 | Violette et al. | |
| 6,213,719 B1 | * | 4/2001 | Violette | B64C 11/06 416/204 A |

(Continued)

FOREIGN PATENT DOCUMENTS

| | | |
|---|---|---|
| FR | 663 270 | 8/1929 |
| FR | 2 942 454 | 8/2010 |

(Continued)

OTHER PUBLICATIONS

French Search Report dated Oct. 8, 2012, corresponding to the Foreign Priority Application No. 762912.

*Primary Examiner* — Dwayne J White
*Assistant Examiner* — Julian Getachew
(74) *Attorney, Agent, or Firm* — Young & Thompson

(57) ABSTRACT

A propeller blade includes an aerodynamic portion and a blade shank, a hub assembly (28, 32) which provides anchoring in a hub, a blade shank assembly of the aerodynamic portion, a safety device including a safety element (24) which extends from a distal assembly in the aerodynamic portion to a proximal assembly (26, 27) in the blade shank and which is adapted to be able to anchor the aerodynamic portion in the blade shank, wherein the blade shank assembly is anchored radially outside the hub assembly, the proximal assembly is anchored to the blade shank radially inside the hub assembly, and the distal assembly and/or the proximal assembly has a strictly positive radial clearance (30).

20 Claims, 3 Drawing Sheets

(56) References Cited

U.S. PATENT DOCUMENTS

2010/0215499 A1    8/2010   Lafont
2012/0121417 A1    5/2012   Lafont

FOREIGN PATENT DOCUMENTS

FR    2 948 425    1/2011
GB    654 105    6/1951

* cited by examiner

BLADE WITH REDUNDANT ANCHORING IN A HUB, PROPELLER, TURBOPROP ENGINE AND AIRCRAFT

FIELD OF THE INVENTION

The invention relates to a blade, especially a blade of a rotating compression machine in a linear flow of fluid.

The invention relates more particularly to a propeller blade for propelling and/or lifting an aircraft. The invention relates also to a propeller, especially a propeller of a turboprop engine of an aircraft, comprising at least one blade according to the invention, and to a turboprop engine and an aircraft.

In particular, the invention proposes a propeller blade, the fixing of which in a propeller hub is improved and especially made secure.

BACKGROUND OF THE INVENTION

A propeller blade is fixed in a propeller hub by the blade shank, which has means for anchoring in the hub according to a longitudinal axis of the blade, and therefore according to a radial axis of the hub. The blade shank often comprises an anchoring bush, which provides a mechanical linkage between an anchoring in the hub and a fixing to the aerodynamic portion of the blade. Accordingly, there is known FR 663270, which discloses a blade the shank of which is fixed by screwing in an anchoring bush, which is itself anchored radially relative to a hub.

However, inspection of the fixing of the aerodynamic portion of the blade in the blade shank and, where applicable, in an anchoring bush is not easy. It is necessary to dismantle the blade from the hub and then dismantle at least the anchoring bush in order to check the condition of the fixing. However, the visual inspection of such an important assembly must be able to be carried out quickly and easily.

Furthermore, in the case of particularly powerful aircrafts, the propeller blades are subjected to very considerable forces, so that the assembly of the aerodynamic portion to the blade shank must be sufficiently strong to retain the blade in the hub, to transmit the movement of the hub to the blades and at the same time to transmit the forces of the blades to the hub (propulsion of the aircraft especially).

The blade shank, and more particularly the anchoring bush, and the fixing of the aerodynamic portion to the blade shank are therefore subjected to high stresses—especially during high accelerations—and to high levels of vibration. They are additionally subjected to considerable forces in a continuous and prolonged manner during long flights, and to impacts in the event of collisions of a blade with a bird, for example.

In the event of rupture of the blade shank and/or of at least part of the anchoring bush while a propeller is rotating, the blade is released, which can have serious consequences for the aircraft and its occupants, or for people and structures on the ground.

For that reason, partial solutions have been proposed, as in U.S. Pat. No. 4,685,864, which describes a blade in which a bundle of fibers extends from the blade shank, in which one of its ends is anchored, to the free end of the blade, in which its second end is anchored. The bundle of fibers is not tensioned on manufacture and prevents part of the blade from being ejected in the event of rupture of its aerodynamic portion. This solution remains partial, however, because it does not solve the problem of the rupture of the blade shank or of the anchoring bush.

Other solutions have been proposed in theory, for example by FR 2942454 and FR 2948425, in which a retaining device is anchored in the blade on the one hand and in a hub on the other hand. However, such devices, which would require adaptation of the hub of each propeller, are heavy and expensive to implement.

Furthermore, in the event of rupture of a blade, the whole of the hub must be dismantled in order to replace the damaged retaining device and blade.

SUMMARY OF THE INVENTION

Accordingly, it is an object of the invention to remedy those disadvantages by proposing a secure propeller blade.

In particular, it is an object of the invention to propose a propeller blade with a reduced risk of ejection in the event of rupture in the blade shank.

It is also an object of the invention to propose a propeller blade the pitch of which can be adjusted in flight.

It is another object of the invention to propose a propeller blade which is particularly lightweight and robust.

It is another object of the invention to propose a propeller blade which can be mounted easily on a hub.

More particularly, it is an object of the invention to propose a propeller blade in which inspection of the assembly of an aerodynamic portion to the blade shank is quick and easy.

It is also an object of the invention to propose a propeller blade, the blade shank of which is particularly compact so that it can be mounted in a hub of reduced dimensions.

It is a further object of the invention to propose a propeller blade with a low maintenance cost.

It is an object of the invention especially to propose a propeller blade which can be replaced quickly and at low cost if it ruptures.

More particularly, it is an object of the invention to propose a propeller blade which can be mounted in an existing propeller and can replace an existing propeller blade that is not equipped with a retaining device.

Throughout the text, "extrados" denotes in the conventional manner one of the two main faces of a blade adapted to create aspiration of the blade by the air flowing along the extrados, from the leading edge to the trailing edge of the blade. Likewise, "intrados" denotes the main face opposite the extrados, which is adapted to create a thrust of the blade by the air flowing along the intrados, from the leading edge to the trailing edge of the blade.

Throughout the text, "chord" denotes a direction passing through the leading edge and the trailing edge of the blade. Likewise, "longitudinal" denotes a direction substantially parallel to a straight line connecting the blade shank to the free end of the blade. The "span" of the blade represents the maximum distance between the blade shank and the free end of the blade. In addition, "thickness" denotes the minimum distance at any point between the extrados and the intrados.

"Radial" denotes a radial direction relative to a rotating shaft of a hub in which the blade according to the invention is to be mounted. Therefore, "radially inner" or "proximal" denotes an element situated on the hub side according to a radial direction of the hub, and "radially outer" or "distal" denotes an element situated on the opposite side from the hub according to a radial direction of the hub.

Accordingly, the invention relates to a propeller blade comprising an aerodynamic portion and a blade shank which is to be mounted in a hub according to a radial direction of said hub, said propeller blade comprising:

an assembly, called the hub assembly, which is capable of providing radial anchoring of the blade shank relative to the hub, an assembly, called the blade shank assembly, which is capable of fixing the aerodynamic portion to the blade shank, a safety device which is separate from the blade shank assembly and comprises at least one safety element:

which extends from a distal end, which is assembled to the aerodynamic portion by a distal assembly, to a proximal end, which is assembled to the blade shank by a proximal assembly, which is adapted to be able to provide radial anchoring of the aerodynamic portion in the blade shank, wherein:

the blade shank assembly is anchored to the blade shank radially outside the hub assembly, the proximal assembly is anchored to the blade shank radially inside the hub assembly, so that the safety element is adapted to be able to prevent the blade from being released by providing radial anchoring of the blade in the event of rupture of the blade between the hub assembly and the distal assembly, at least one of the distal assembly and the proximal assembly has a strictly positive radial clearance, so that, under normal operating conditions of the blade, only the blade shank assembly provides radial anchoring of the aerodynamic portion in the blade shank.

The aerodynamic portion has an aerodynamic surface capable of exerting forces on air.

The hub assembly of the blade shank provides radial anchoring of the blade in a hub, especially in a radial hub shaft, by virtue of anchoring means. The anchoring is at least radial relative to the hub. However, the anchoring is advantageously only radial in order to allow the blade to rotate about its longitudinal axis (about a radial axis of the hub) in order to permit adjustment of the pitch on the blade on the ground and in flight, especially automatic adjustment by means of an adjustment device which is mounted in the hub of the propeller and connected to the blade shank.

Numerous types of hub assembly can be envisaged: for example, one or more shoulder(s) of the blade shank in unidirectional radial abutment on (a) shoulder(s) of the radial hub shaft. The shoulder of the anchoring bush extends radially towards the outside of the bush, and the shoulder of the hub extends radially towards the inside in a radial shaft. The shoulders can be formed, for example, by virtue of flanges. Ball bearings (or, as equivalents, roller bearings, etc.) can advantageously be interposed between said shoulders. The bearings allow friction between the anchoring bush and the hub in the sense of a rotation about the longitudinal axis of the blade (a radial axis of the hub) to be reduced, so as to permit easy adjustment of the pitch of the blade.

Other types of hub assembly can be envisaged, for example by screwing of the blade shank in an internal thread of the radial shaft with or without an interposed path of balls. In the case where adjustment of the pitch of the blade is not necessary, it is possible to choose, for example, adhesive bonding, clamping, an interlocking assembly (dovetailed blade shank, etc.), an assembly by means of connected parts (bolts, screws, etc.), welding, etc.

The aerodynamic portion can be assembled to the blade shank in the aerodynamic portion, in the blade shank, or in an intermediate portion. Such an assembly can be of any type, for example by adhesive bonding, by clamping, by an interlocking assembly, by joining by means of connected parts (bolts, screws, etc.), by soldering, by heat treatment permitting fusion of their respective materials at the interfaces, etc.

Advantageously, the blade shank assembly prohibits any relative movement of the blade shank and the aerodynamic portion, so that it provides complete fixing of the blade shank and the aerodynamic portion. Accordingly, the blade shank provides both radial blocking of the aerodynamic portion relative to the hub, especially in order to retain it when the propeller is rotating, and blocking in rotation around the longitudinal axis of the blade (radial relative to the hub) in order to transmit an adjustment of the pitch of the blade.

In addition, the blade shank assembly is anchored to the blade shank radially outside the hub assembly, so that the blade shank assembly can be arranged in a zone of the blade that is to be outside the hub once the blade shank is mounted in the hub. Accordingly, the blade shank assembly can easily be inspected, especially by a visual inspection, without the blade's having to be dismantled from the hub. Visual inspection of the whole of the blade shank assembly of a blade according to the invention is therefore quick and simple.

In particular, advantageously and according to the invention, the blade shank assembly is located in a portion of the blade shank that is to protrude from the hub when said blade shank is mounted in a radial shaft of a hub.

Accordingly, a blade according to the invention can also be replaced quickly and easily without serious intervention and without prolonged maintenance stoppage for the aircraft on which it is mounted. The aerodynamic portion of the blade especially (hollow casing, framework, etc.) can be detached from the anchoring bush and replaced. The replacement costs are thus reduced.

In addition, a blade according to the invention advantageously further comprises an aerodynamic cover which is to prolong the aerodynamic portion around a radially outer portion of the blade shank.

Such an aerodynamic cover is advantageously provided to cover the portion of the blade shank that is to protrude from the hub when said blade shank is mounted in a radial shaft of a hub. The aerodynamic cover covers the blade shank assembly and is advantageously assembled simply to the remainder of the blade (for example by screwing), so that a maintenance employee can easily and quickly dismantle the aerodynamic cover in order to inspect the blade shank assembly.

Arranging the blade shank assembly radially outside the hub assembly, in particular in a zone of the blade that is to be outside the hub once the blade shank is mounted in the hub, has a second advantage. In the case of blades that are to be mounted on a propeller that is to be mounted on a particularly powerful turboprop engine, the blade shank assembly has large dimensions in order to provide sufficient fixing of the blade in light of aeronautical safety standards. Those large dimensions of the blade shank assembly would make it necessary to produce a blade shank (in particular an anchoring bush) with a particularly large diameter and a correspondingly large hub, which would have the effect of increasing the weight and the total cost of the aircraft.

However, arranging the blade shank assembly in a zone radially outside the blade shank has the disadvantage of making the blade shank work in traction (at least the portion of the blade shank that is situated between the hub assembly and the blade shank assembly), increasing the fatigue of the blade shank and therefore increasing the likelihood of its rupturing.

The safety device is adapted to be able to provide anchoring of the blade, especially of the aerodynamic portion, in the blade shank. In particular, the safety element is of such a size that it is able to support the inertia of the blade rotating on a propeller at the maximum acceleration and at the maximum rotational speed of said propeller mounted on a turboprop engine.

However, the safety device does not provide anchoring of the blade under normal operating conditions of the blade, so that it is perfectly separate from the blade shank assembly which, on the other hand, provides anchoring of the blade (especially of the aerodynamic portion in the blade shank) under normal operating conditions of the blade.

The safety element can be flexible or rigid. However, advantageously and according to the invention, the safety element is a rigid element extending at least partly radially in the aerodynamic portion and at least partly in the blade shank.

The safety device further comprises a distal assembly which is adapted to be able to anchor (in particular in the case where the safety element is placed under stress) a distal end of the safety element in the aerodynamic portion of the blade. The safety device also comprises a proximal assembly which is adapted to be able to anchor (in particular in the case where the safety element is placed under stress) a proximal end of the safety element in the blade shank.

The proximal assembly is more particularly adapted to be able to provide radial anchoring of the safety element radially inside at least part of the hub assembly, so that, in the event of rupture of the blade radially beyond the hub assembly, the safety device is capable of providing anchoring of the blade and therefore retention of the blade relative to the hub, even if the rupture occurs in the blade shank. Accordingly, ejection of the blade is avoided.

In particular, when the blade shank comprises an anchoring bush, the latter has a proximal base, and the proximal assembly advantageously provides anchoring of the safety element on that anchoring bush base.

When the hub assembly has various redundant anchorings distributed radially along the blade shank, the proximal assembly is anchored beyond the radially innermost anchoring of the hub assembly. Accordingly, even in the event of rupture of the blade shank in a zone that is radially very inwards, that is to say close to the proximal end of the blade shank, especially between two redundant anchorings of the hub assembly, the safety device still provides anchoring of the blade by forming a mechanical connection which transmits the radially innermost anchoring of the hub assembly to the aerodynamic portion.

The safety device is, therefore, capable of providing anchoring of the blade in the event of rupture of said blade at any point between the distal assembly and a radially innermost anchoring of the hub assembly, sufficient for anchoring the blade in a hub. The invention therefore advantageously solves the problem of ejection of the blades in the event of rupture of the blade shanks.

Furthermore, the safety device is wholly contained in the blade. A propeller blade is accordingly replaced simply and rapidly in one piece with a blade according to the invention, without requiring dismantling, adaptation or replacement of the hub of the propeller. The mounting of a blade according to the invention is in this respect equivalent to the mounting of a conventional blade that is not equipped with safety devices. Advantageously and according to the invention, said safety device is passive under normal conditions of use of the blade.

Normal operating conditions of the blade are understood as being conditions in which the structure of the blade—with the exception of the safety device—is sufficiently integral to ensure the correct anchoring thereof: that is to say that, in particular, the blade shank, the blade shank assembly and the hub assembly are integral and provide radial anchoring of the blade.

Under normal operating conditions of the blade, the safety device does not provide radial anchoring of the blade, that is to say it is passive and is not subject to, or is subject to few, loads radially (that is to say longitudinally for the safety element). Accordingly, the safety device is not subject to wear or to fatigue and remains integral until it is placed under stress.

Although numerous methods of producing a safety device that is passive under normal operating conditions of the blade can a priori be envisaged, the inventors have found that it is particularly advantageous to produce the distal assembly and/or the proximal assembly with a strictly positive radial clearance in order to ensure that the safety element is not (or very little compared with the inertia of a rotating blade) subjected to radial loads under those conditions.

A strictly positive clearance is a non-zero positive clearance.

Advantageously and according to the invention, the aerodynamic portion comprises at least:
a hollow casing having an aerodynamic surface which is to exert a force in air, extending from the blade shank to a free end of the blade in the direction of the span, and from a leading edge to a trailing edge in the direction of the chord,
a framework:
arranged in the hollow casing,
comprising a plurality of soles which are in surface contact with the hollow casing so as to provide structural support for the hollow casing.

The hollow casing (which is sometimes also called the skin) is a casing which provides an aerodynamic function and a structural function.

For that reason, the framework provides structural support for the hollow casing by way of soles that are in surface contact with the inner surface of the hollow casing. Accordingly, the framework supports the outer shape of the hollow casing, therefore of the extrados and the intrados at least, and therefore maintains, especially maintains over time, the aerodynamic performance of the blade. The framework also advantageously maintains over time the shape of the leading edge and of the trailing edge.

A framework according to the invention extends in at least part of the hollow casing and can have a single element, for example a box spar, or a plurality of elements assembled together. A framework according to the invention advantageously comprises a plurality of spars which do or do not form a plurality of boxes.

As well as providing structural shape support for the hollow casing, the framework also provides the blade with resistance to different types of static and dynamic forces, especially bending and torsional forces.

Furthermore, the framework provides, by the blade shank assembly, anchoring of the hollow casing relative to the blade shank.

For that reason, the framework is advantageously integral with the hollow casing at least in the region of soles in surface contact, for example by adhesive bonding, joining, heat fusing, thermoforming, copolymerization, co-curing, etc. The safety element is, advantageously and according to the invention, assembled by the distal assembly to said framework of the aerodynamic portion.

If only one of the distal assembly or the proximal assembly has a positive clearance, the second advantageously creates a fixed assembly between the aerodynamic portion and the safety element or between a proximal part of the blade shank and the safety element.

In particular, advantageously and according to the invention, the distal assembly provides a fixed assembly, without clearance, of the safety element to the framework.

The distal assembly can be produced in various ways: adhesive bonding, heat fusing, thermoforming, by connected parts (bolts, screws, etc.), by welding, etc.

Advantageously and according to the invention, the safety element extends at least partially in the aerodynamic portion in contact with the framework to which it is attached by the distal assembly. The distal assembly is chosen to be able to retain the blade in the case where all the inertia of the blade passes through the safety device.

Advantageously, a blade according to the invention is also characterized in that the blade shank comprises an anchoring bush providing the hub assembly in cooperation with a hub shaft, the blade shank assembly in cooperation with the aerodynamic portion, and the proximal assembly in cooperation with the safety element.

The anchoring bush has means of anchoring to the hub that are adapted to form said hub assembly.

The anchoring bush has means of fixing the aerodynamic portion to the blade shank that are adapted to form said blade shank assembly.

The anchoring bush has at least one safety element of the safety device adapted to form said proximal assembly. The safety element is advantageously anchored radially inside the radially innermost anchoring means or to the hub, especially at the base of the anchoring bush.

The anchoring bush is adapted so that the variations of the relative positions between the blade shank assembly and the hub assembly under normal operating conditions of the blade remain smaller in amplitude than the positive clearance provided in the distal assembly and/or in the proximal assembly.

In addition, advantageously and according to the invention, the anchoring bush is adapted so that, once the blade is mounted in a hub, the blade shank assembly is radially outside the hub.

In particular, the arrangement of the hub assembly, and of the blade shank assembly, on the anchoring bush is adapted so that the blade shank assembly is outside the hub when the blade is mounted in the hub.

Accordingly, the anchoring hub is adapted to allow the blade shank assembly to be arranged outside the hub, and the anchoring bush therefore has a portion that is to be mounted in a radial shaft of the hub of reduced diameter relative to the dimensions of the blade shank assembly. In that manner, the anchoring bush also permits easier visual inspection of the blade shank assembly.

Also, advantageously and according to the invention, the blade shank assembly is covered with an aerodynamic cover which prolongs the aerodynamic portion around a radially outer portion of the blade shank.

Such an aerodynamic cover allows the aerodynamics of each blade and of a propeller according to the invention to be improved, despite a portion of the blade shank protruding radially from the hub.

Advantageously, a blade according to the invention is also characterized in that the proximal assembly comprises at least:
- a safety loop formed in the proximal end of the safety element,
- a safety pin:
  which passes through said safety loop,
  which is spaced apart from the safety loop by a strictly positive clearance under normal operating conditions of the blade,
  the ends of which are received in housings of the anchoring bush, said housings being anchored radially inside the hub assembly.

In particular, the safety pin is located in the proximal portion of the blade shank, longitudinally beyond the blade shank assembly and the hub assembly, advantageously in a proximal portion of the blade shank before the anchoring means to the hub that are closest to the base of the anchoring bush.

The safety pin and the safety loop are adapted to retain the blade in the anchoring bush under adverse operating conditions (at least partial rupture of the normal fixing means).

In particular, the safety pin and the safety loop are adapted to withstand the inertia of the blade at operating accelerations and operating speeds of the turboprop engine on which at least one propeller comprising a blade according to the invention is mounted.

The safety pin and the safety loop are spaced apart by a strictly positive clearance so that the safety device is passive under normal operating conditions.

The anchoring bush, the safety loop and the safety pin are advantageously adapted so that the clearance between the safety loop and the safety pin is positive as long as the blade is operating normally, that is to say in particular as long as the blade shank assembly and the blade shank are integral.

The clearance is advantageously at least radial, at least between a distal face of the safety pin and an opposing proximal face of the safety loop.

Accordingly, under normal operating conditions, the safety loop and the safety pin are not subject to wear or fatigue. They are placed under stress only in an emergency, that is to say where there is a risk of the blade's being ejected, especially in the event of rupture in a part situated between the hub assembly and the distal assembly.

The clearance is advantageously also sufficient to prevent any contact between the safety loop and the safety pin in the case of relative vibrations thereof.

For that reason, advantageously and according to the invention, the clearance between the safety loop and the safety pin is filled with a material adapted to absorb relative vibrations of the safety loop relative to the safety pin.

The absorbing material is in particular a material that is softer than the safety pin and the safety loop.

The absorbing material is advantageously adapted to transmit only very few radial forces in order to avoid wear or fatigue of the safety loop and of the safety pin. The radial forces transmitted by such an absorbing material under normal operating conditions are in particular advantageously very much lower than the radial forces necessary to provide anchoring of the blade in a hub.

Accordingly, the absorbing material can be chosen, for example, from elastomeric, anti-friction or equivalent materials.

Moreover, advantageously and according to the invention, the distal assembly serves to join the safety element to the aerodynamic portion fixedly and without clearance.

Accordingly, a blade according to the invention does not comprise moving elements in the aerodynamic portion, so that the blade is both simpler and less sensitive to vibrations.

Advantageously and according to the invention, at least one safety element is a spar, called the safety spar, which extends at least partly in the aerodynamic portion and into the blade shank. The spar is a structural element, especially an element of the framework of the blade, so that it is integral with the aerodynamic portion of the blade at least. Its distal end therefore forms a distal assembly which is fixed and without clearance in the aerodynamic portion. Anchoring of the blade in the event of rupture is therefore provided by a spar of the blade, so that it is strong anchoring.

Accordingly, the blade does not have any moving or removable element in the aerodynamic portion. More particularly, the safety element and the framework are integral so that they can be displaced together like a single part.

At least one safety spar is a solid spar. More particularly, each safety spar is advantageously solid.

In addition, advantageously and according to the invention, the safety element is a spar of the framework which extends at least partly in the aerodynamic portion and into the blade shank, where its proximal end forms at least one safety loop.

A spar according to the invention is a structural element which extends longitudinally substantially in the direction of the span in the aerodynamic part over at least a portion of the span of the blade. Such a spar can be solid or hollow and can perform various functions such as, especially, bending and/or torsional reinforcement of the blade.

The safety loop is advantageously formed at the proximal longitudinal end of the spar forming the safety element.

Moreover, advantageously and according to the invention, the blade shank assembly comprises at least:
- a root loop of the aerodynamic portion, which extends into the blade shank,
- a root pin for each root loop, which root pin:
- passes through said root loop,
- is mounted without clearance in said root loop,
- is fixedly assembled to the anchoring bush.

The blade shank assembly according to the invention advantageously comprises a single root pin passing through each root loop.

Each root pin is anchored—for example by its ends—in the anchoring bush, particularly advantageously in a portion of the anchoring bush that is to protrude from a hub once the blade shank has been mounted in a radial shaft of said hub. For example, a root pin can be a bolt which passes through the anchoring bush and a root loop from one side to the other and which is clamped on each side of the anchoring bush.

The root loops are advantageously mounted with zero or negative clearance on the root pins.

Advantageously, a blade according to the invention is also characterized in that the framework comprises at least two spars, called reinforcing spars, each:
- fixedly assembled in the aerodynamic portion,
- having at least one root loop at its proximal end.

The reinforcing spars provide the aerodynamic portion with resistance to torsional and especially bending stresses (in the thickness direction and in the direction of the chord).

Each root loop is advantageously formed at the proximal longitudinal end of a reinforcing spar. The reinforcing spars thus serve to fix the aerodynamic portion to the blade shank. In normal operation, the reinforcing spars alone serve to fix the aerodynamic portion to the blade shank.

Advantageously and according to the invention, the safety element and the reinforcing spars are made of composite material comprising at least a majority of fibers that are unidirectional in the direction of the span. More particularly, advantageously and according to the invention, the safety element and the reinforcing spars are solid.

The safety framework and the reinforcing spars accordingly comprise an assembly of fibers that are advantageously oriented in the direction of the span.

Throughout the text, "composite material" denotes any solid synthetic heterogeneous material which combines at least two phases. The term denotes especially a material comprising at least one reinforcement and at least one matrix, the reinforcement, which is formed of a first material, being adapted to confer mainly mechanical strength properties on said composite material, and the matrix, which is formed of at least a second polymer material, protecting the reinforcement and transmitting stresses thereto, where applicable.

Arranging unidirectional fibers in the direction of the span allows the resistance of the spars and of the safety element to forces causing bending of the blade to be optimized.

In addition, the fibers form a winding around the safety pin and the root pins by following the shape of the safety loop and of each root loop, respectively.

Advantageously and according to the invention, each reinforcement in the form of fibers is chosen from carbon fibers, aramid fibers, carbon-aramid fibers, glass fibers and natural fibers such as hemp or bamboo fibers.

Likewise, the hollow casing and the framework are advantageously made of composite material.

In addition, advantageously and according to the invention, each of the parts of the blade is formed of composite material, the polymer matrix of which is of identical chemical nature.

Advantageously and according to the invention, each polymer matrix is chosen from the group formed of epoxy resins, polyurethane resins, phenolic resins, polyester resins, vinyl ester resins, bismaleimide (BMI) resins and mixtures thereof.

Advantageously and according to the invention, each polymer matrix is chosen from the group formed of polyamides (PA), polyethylene terephthalates (PET) and polybutylene terephthalates (PBT), polycarbonates (PC), polyphenylene oxides (PPO), polybenzimidazoles (PBI), polyoxymethylenes (POM), polyether imides (PEI), polysulfones (PSU), polyphenylsulfones (PPSU), polyether sulfones (PES), polyether ether ketones (PEEK), polyphenyl sulfides (PPS), polyamide imides (PAI), polyimides (PI) and mixtures thereof.

Advantageously and according to the invention, the hollow casing, the framework (especially the box spar) and the reinforcing spars are attached mechanically to one another.

All techniques of attaching those elements may be envisaged.

Advantageously and according to the invention, a treatment, called pre-consolidation, which permits attachment of the framework, the reinforcing spars and the reinforcements previously put in position and in contact with one another, is carried out.

Once the elements forming the framework of the blade have been assembled by simply being brought into contact, it is possible to carry out pre-consolidation of the framework, in particular in the case where a thermoplastic polymer matrix is used, by subjecting the framework to heat treatment under pressure.

It is possible to store the framework so formed, before or after any pre-consolidation of the framework, prior to carrying out a subsequent step of a process according to the invention.

Accordingly, the hollow casing, the framework (in particular the reinforcing spars) and the safety framework at least are prepared independently and then brought into contact with one another in their respective final positions.

For that reason, advantageously and according to the invention, the hollow casing is arranged in surface contact with the upper soles and the lower soles of the box spar.

There is obtained in that manner final polymerization of the polymer matrix (in the case of a thermosetting matrix) or fusion of the polymer matrices (in the case of a thermoplastic matrix) of the composite materials involved simultaneously in those elements by creating polymer bonds at the interfaces between the elements. A continuous bond is thus formed between at least one polymer matrix of the hollow casing and at least one polymer matrix of the framework, and between at least one polymer matrix of the framework and at least one polymer matrix of the safety element.

The invention relates also to a turboprop engine propeller comprising at least one blade according to the invention.

A blade according to the invention is advantageously used on an aircraft turboprop engine propeller, in multiple units. Accordingly, a turboprop engine propeller according to the invention advantageously comprises at least two blades, especially advantageously between three and eight blades according to the invention. A propeller according to the invention also advantageously comprises a central hub which is driven by a motor, and generally a device for adjusting the pitch of the blades on the ground and during flight. The central hub has a plurality of radial shafts distributed radially around the hub and in each of which a blade shank comprising an anchoring bush is mounted.

In particular, a propeller according to the invention comprising a plurality of blades according to the invention can advantageously be mounted on an aircraft with particularly powerful turboprop engines, the blades being secured in the event of rupture of their blade shank.

A propeller according to the invention makes use of the advantages of the blades according to the invention and is therefore, inter alia, particularly lightweight, robust and easy to inspect.

The invention therefore extends also to a turboprop engine comprising at least one propeller according to the invention.

Such a turboprop engine advantageously comprises one or two propellers according to the invention. When said turboprop engine comprises a plurality of propellers according to the invention, they may be, for example, contra-rotating.

The invention extends also to an aircraft comprising at least one turboprop engine according to the invention.

An aircraft comprising turboprop engines with propellers comprising blades according to the invention is particularly advantageous. It is, in fact, a potentially powerful aircraft, which is therefore able to transport heavy loads owing to powerful turboprop engines and lightweight propellers. Furthermore, despite the power of the turboprop engines and the lightness of the propellers, the aircraft is particularly safe by virtue of the safety device, which is capable of avoiding the ejection of a blade in the event of rupture of its blade shank.

The aircraft advantageously comprises two, four, six or eight turboprop engines, and can have more in order to develop even greater power, especially during take-off.

Maintenance of such an aircraft is also facilitated by virtue of a blade according to the invention.

The invention relates also to a propeller blade, a turboprop engine propeller, a turboprop engine and an aircraft, characterized in combination by all or some of the features mentioned hereinabove or hereinbelow.

BRIEF DESCRIPTION OF THE DRAWINGS

Other objects, features and advantages of the invention will become apparent upon reading the following description, which is not to be interpreted as limiting and makes reference to the accompanying figures, in which.

DETAILED DESCRIPTION OF THE INVENTION

The propeller blade according to the invention shown in FIGS. 1 to 4 is a blade of a propeller of a turboprop engine of an aeroplane.

Figure 1:
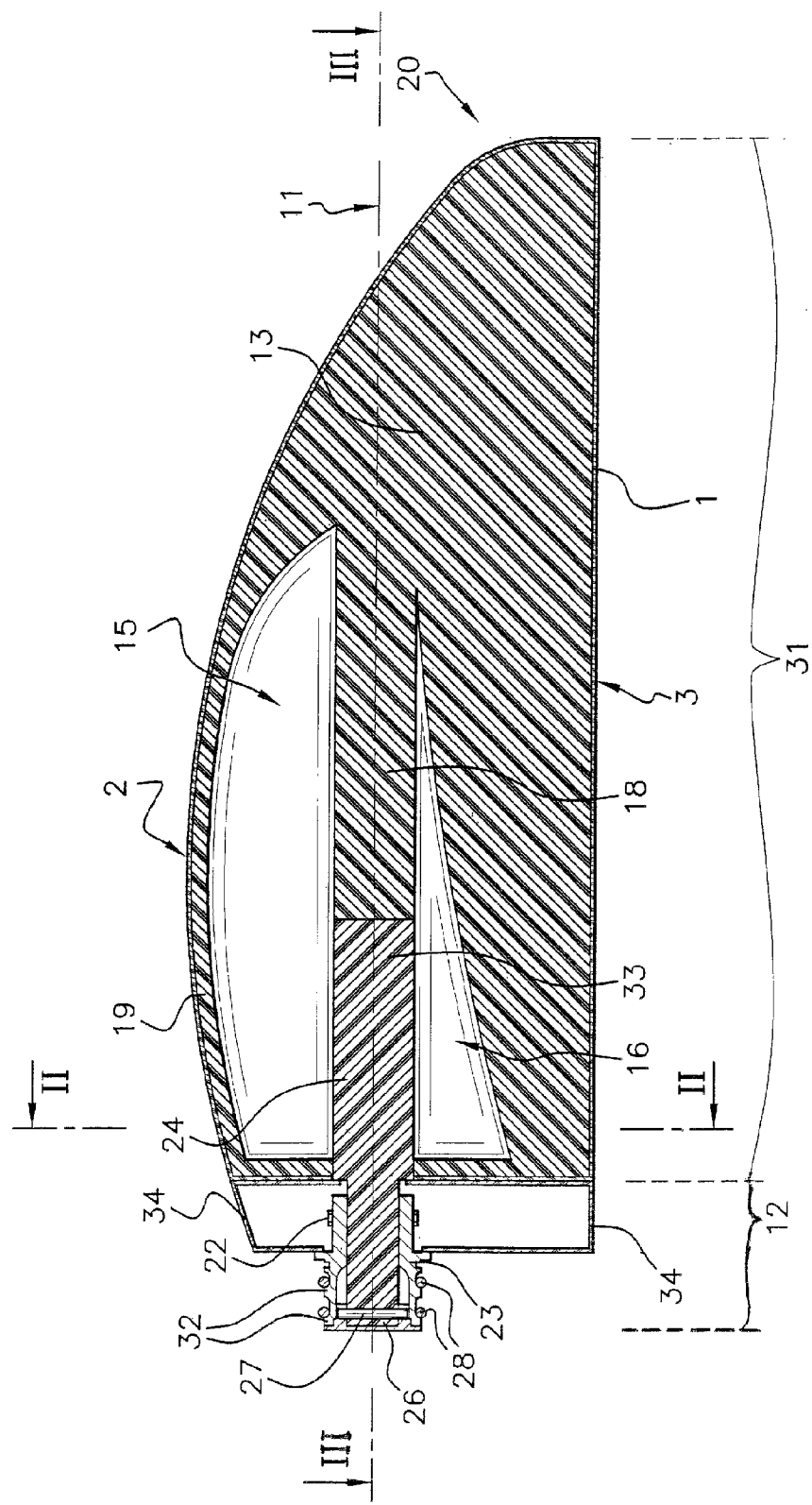
FIG. 1 is a schematic representation of a propeller blade according to an embodiment according to the invention, in a top view of a longitudinal section through a surface comprising the chords of the blade.

The blade is not flat, therefore in FIG. 1 it is shown in a top view (from the extrados) in a section through a complex surface comprising the totality of the chords of the blade. Some internal elements of the blade are thus visible.

The blade has an aerodynamic portion 31 comprising a hollow casing and a framework. The hollow casing 1 has an aerodynamic surface forming an extrados 5 and an intrados 4, each of which extends from a leading edge 2 to a trailing edge 3 in the direction of the chord 25, and from a blade shank 12 to a free end 20 of the blade in the direction of the span. The chord 25 of the blade is, at any point along the span, a straight line passing through the leading edge 2 and the trailing edge 3 and orthogonal to a longitudinal axis 11. The longitudinal axis 11 is a longitudinal axis of the blade, in the continuation of the blade shank. When the blade is mounted in a radial shaft of a propeller hub, the longitudinal axis 11 corresponds at least substantially to a radial axis of the hub.

Likewise, the blade has a blade shank 12 which extends beyond the hollow casing 1 and allows the blade to be anchored in a radial hub shaft. The blade shank 12 comprises in particular an anchoring bush 23 in which there extend certain structures of the framework extending mainly in the aerodynamic portion 31.

Figure 2:
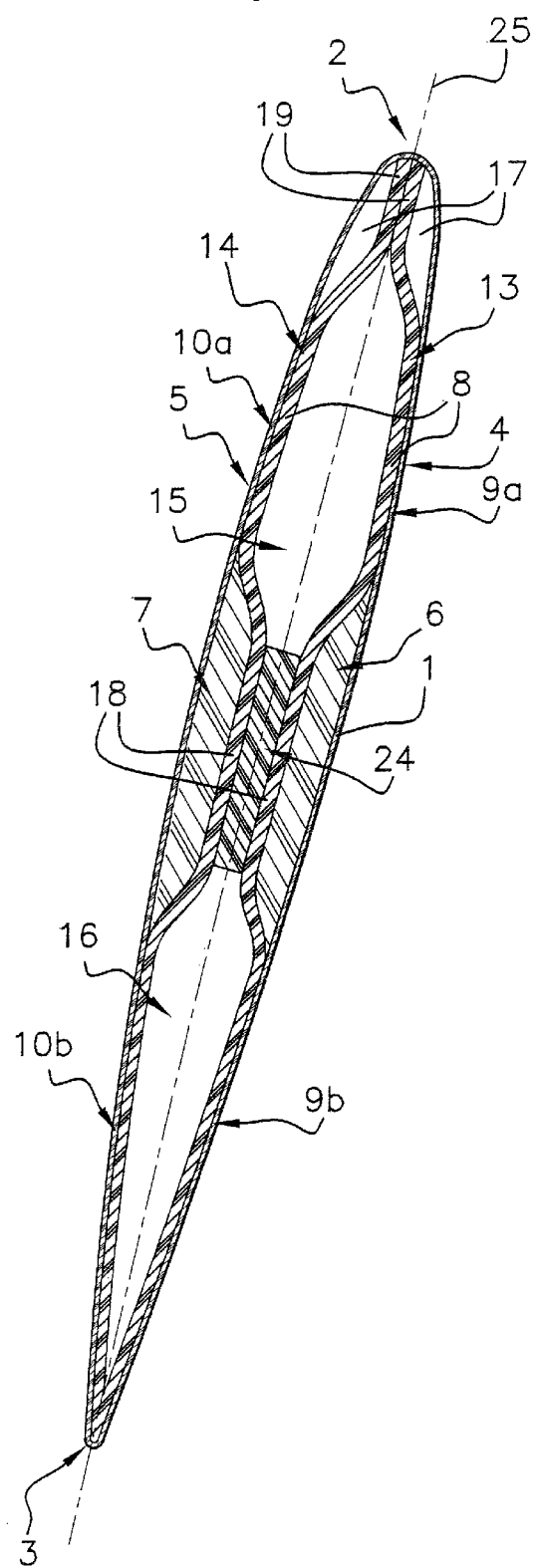
FIG. 2 is a view in transverse section according to plane II-II of a blade according to the invention according to the embodiment of FIG. 1.

In FIG. 2, the internal structure of the blade is shown by a first section II-II through a transverse plane shown in FIG. 1, at a sixth of the span of the blade.

In the hollow casing 1, a framework comprising a box spar 8 and two reinforcing spars 6, 7 supports the shape of said hollow casing by way especially of lower soles 9a, 9b on the intrados side and upper soles 10a, 10b on the extrados side. Said soles 9a, 9b, 10a, 10b are in contact with the inside surface of the hollow casing.

The box spar 8 supports the leading edge 2 by way of two connections 19 which extend at the front of the box spar to the inside surface of the hollow casing. The box spar 8 supports the trailing edge 3 by virtue of the extension of the rear soles 9b, 10b to the trailing edge.

The box spar 8 provides structural support for the hollow casing and imparts torsional strength to the hollow casing and therefore to the blade.

The box spar 8 extends over 90% of the span of the blade, starting from the blade shank, and does not extend into the blade shank.

The box spar 8 is advantageously formed of two half-shells 13, 14. A first half-shell, called the lower half-shell 13, on the intrados 4 side has a front connection 19 in contact with the leading edge, a front lower sole 9a, a central connection 18, a rear lower sole 9b, which extends in contact with the inside surface of the hollow casing 1 to the trailing edge 3.

A second half-shell, called the upper half-shell 14, on the extrados 5 side has a front connection 19 in contact with the leading edge, a front upper sole 10a, a central connection 18, a rear upper sole 10b, which extends in contact with the inside surface of the hollow casing 1 to the trailing edge 3.

Between the two front soles 9a, 10a of the box spar there extends a front cavity 15 inside the box spar. The front cavity 15 extends longitudinally over approximately 80% of the span of the blade.

Likewise, between the two rear soles 9b, 10b of the box spar there extends a rear cavity 16 inside the box spar. The rear cavity 16 extends longitudinally over approximately 60% of the span of the blade.

In the embodiment shown, the front cavity 15 and the rear cavity 16 are left empty, that is to say are filled with air, in order to propose a very lightweight blade.

Furthermore, there remain two forward cavities 17 close to the leading edge 2, between the hollow casing and the front connections 19 of the box spar with the hollow casing. Those forward cavities 17 are advantageously filled with a lightweight and strengthening filling foam in order to improve the impact resistance of the leading edge.

Between the central connections 18 of each of the two half-shells 13, 14 of the box spar 8 there extends a safety element 24 which isolates the front cavity 15 from the rear cavity 16 completely.

The safety element 24 is a spar of the framework which contributes to the bending strength and vibration resistance of the blade, especially by preventing the central connections 18 of the box spar 8 from colliding in the event of vibrations. The thickness of the safety element diminishes in the direction away from the blade shank, so that the safety element extends over approximately one quarter of the span of the blade, starting from the blade shank, because it is then thinner and the central connections 18 of the two half-shells 13, 14 are assembled to one another.

Moreover, between the central connection 18 of the lower half-shell 13 and the hollow casing there extends a lower reinforcing spar 6. Likewise, between the central connection 18 of the upper half-shell 14 and the hollow casing there extends an upper reinforcing spar 7.

The totality of the reinforcing spars 6, 7, the central connections 18 of the box spar and the safety element 24 forms the core of the blade, which extends generally longitudinally along the longitudinal axis 11, in the axis of the blade shank, and therefore of a radial hub shaft in which the blade is to be fixed.

The two reinforcing spars 6, 7 are in surface contact with the central connections 18 and the hollow casing. They extend longitudinally over approximately 60% of the span of the blade and provide increased bending strength around axes orthogonal to the longitudinal axis 11. Their thickness also diminishes along the longitudinal axis 11 in the direction away from the blade shank, especially in their portion closest to the free end 20 of the blade. Accordingly, the reinforcing spars 6, 7 have a smaller thickness in FIG. 3 as compared with FIG. 2.

The reinforcing spars 6, 7, the box spar 8 and the safety element 24 are all attached to one another and are attached to the hollow casing 1 by way of the soles 9a, 9b, 10a, 10b and the contact between reinforcing spars 6, 7 and hollow casing 1. The blade thus forms a single unit mechanically, without elements that are movable relative to one another.

Advantageously, a blade according to the invention is prepared by a process in which:
- the framework is prepared, the cavities of said box spar being spaced apart in a direction, called the chord direction of the blade,
- the hollow casing is prepared,
- the hollow casing is arranged around the framework, at least part of the framework being in surface contact with the hollow casing,
- once the hollow casing has been arranged around the framework, a step of consolidation of the blade is carried out, at a predetermined temperature, so as to form a continuous bond between at least one polymer matrix of the hollow casing and at least one polymer matrix of the framework.

In particular, each of those elements was prepared in its final form independently of the other parts, with optional partial polymerization of their polymer matrix (especially in the case of a thermosetting matrix). They were then arranged relative to one another in their final position, the hollow casing especially being in contact with the reinforcing spars and with the box spar in the region of the soles and the front connections 19, and the box spar further being in contact with the reinforcing spars and with the safety element. Then, a final heat treatment was applied to the blade in order to obtain polymerization of the whole so that polymerization of the polymer matrix of each part was completed, creating polymer bonds in the region of the areas of contact between the parts. Said parts thus form a single part, in one unit mechanically.

In particular, the safety element 24 is attached to the framework, and in particular to the box spar 8, so as to form a distal assembly of the distal end of the safety element 24 in order to be able to retain the blade in the event of rupture of the blade shank.

The reinforcing spars 6, 7 extend into the blade shank 12, where they form root loops 21 forming a blade shank assembly adapted to fix the framework in the anchoring bush 23.

Figure 3:
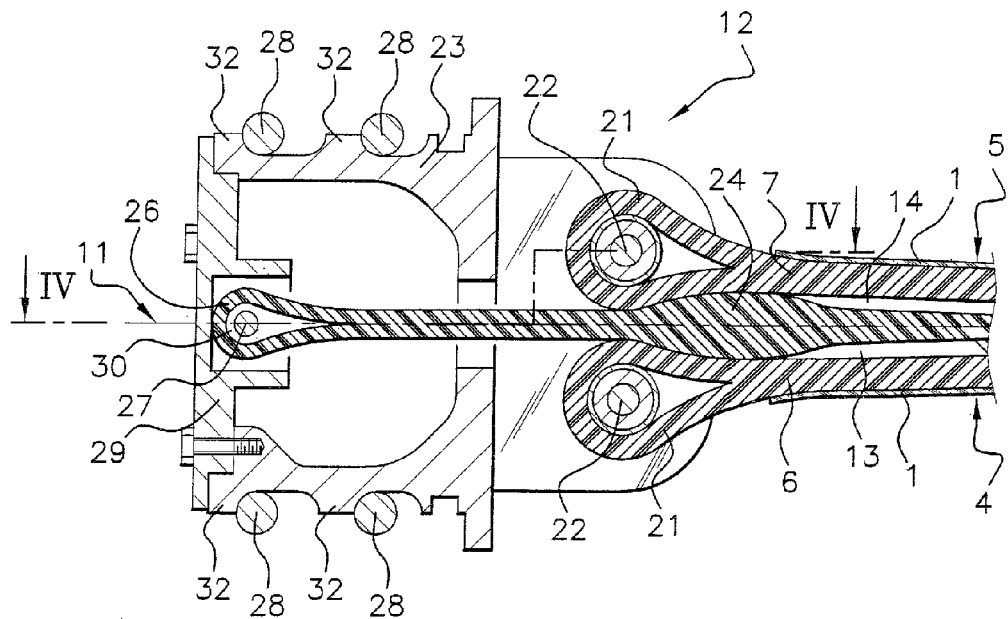
FIG. 3 is a view in longitudinal section according to plane III-III of a blade shank according to the invention according to the embodiment of FIGS. 1 and 2.
Figure 4:
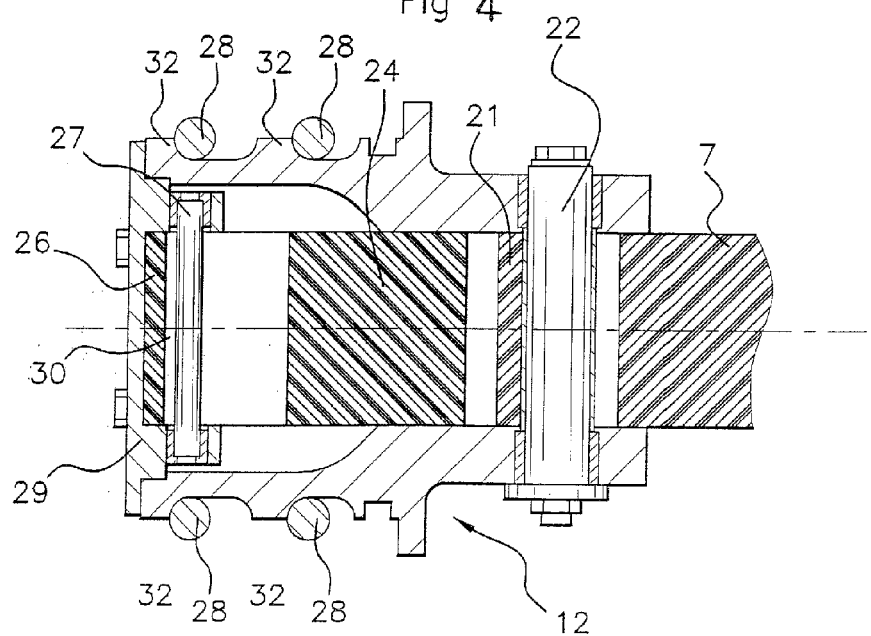
FIG. 4 is a view in section through portions of parallel planes IV-IV as shown in FIG. 3 of a blade shank according to the invention according to the embodiment of FIGS. 1, 2 and 3.

As shown in FIGS. 3 and 4, the root loops 21 coil around root pins 22 mounted integral with the anchoring bush 23. The root pins 22 of the reinforcing spars 6, 7 are advantageously bolts which pass through the root loops 21 and the anchoring bush 23 from one side to the other.

The blade shank assembly (root loops and root pins) is arranged radially outside the hub assembly (bearings 28 and shoulders 32). In particular, the blade shank assembly is arranged in a portion of the anchoring bush that is to protrude from the hub in which the blade is to be mounted.

The portion of the blade shank that is to protrude from the hub is equipped with an aerodynamic cover 34 allowing the aerodynamic surface of the blade to be extended in the direction of the blade shank and its penetration into the air, and therefore the efficiency of a propeller comprising such blades, to be improved, and the fuel consumption of a turboprop engine and therefore of an aircraft so equipped to be reduced, while improving their maintainability by procuring easy access to the blade shank assembly in order to carry out inspections of its integrity.

In the event of rupture of one or both root loops 21 or of one or both root pins 22 (therefore of the blade shank assembly), the safety element 24 alone serves to anchor the blade in the anchoring bush 23.

To that end, the safety element 24 has, at its proximal end, a safety loop 26 through which there passes a safety pin 27 mounted by its two ends in housings of the anchoring bush 23, in particular in housings of a base 29 of the anchoring bush. The safety element is thus—in the event of rupture in the blade shank—anchored radially inside the anchoring means 28, 32 of the anchoring bush in a hub.

The safety loop 26 and the corresponding safety pin 27 are mounted close to the base 29 of the anchoring bush so as to be able to retain the blade in the event of rupture of the fixing means (root loops or root pins) or of the anchoring bush in a zone between the safety pin 27 and the fixing bolts 22.

The safety loop 26 and the safety pin 27 are mounted such that a strictly positive clearance 30 separates them. The safety loop 26 of the safety element 24 thus does not become worn and is not subject to structural fatigue during normal operation. Only in the event of rupture of the fixing means or of the anchoring bush does the safety loop 26 come into contact with the safety pin 27 in order to provide safety anchoring of the blade.

The hollow casing, the reinforcing spars 6, 7, the box spar 8 and the safety element 24 are all made of composite material in order to provide a particularly lightweight blade. In particular, the reinforcing spars 6, 7 and the safety element 24 are made of composite material in which a large majority of the fibers are unidirectional according to the longitudinal axis 11, that is to say according to the span of the blade, so as to improve their bending strength.

The unidirectional fibers of the reinforcing spars 6, 7 and of the safety element 24 coil at the proximal ends of said spars and safety element to form the root loops and the safety loop, so as to provide maximum strength, especially tensile strength according to the longitudinal axis 11 corresponding to a centrifugal force when the blade is mounted in a radial shaft of a hub driving the blade(s) in rotation.

The reinforcing spars and the safety element 24 are advantageously a matrix of carbon fibers arranged longitudinally along the span of the blade (radially relative to a hub), in an epoxy resin.

The anchoring bush 23 is adapted to anchor the blade by its shank in a radial hub shaft. It advantageously has shoulders 32 equipped with peripheral bearings 28 which are adapted to abut circular shoulders of a radial hub shaft, so as to be able to adjust the pitch of the blade.

The shoulders 32 equipped with bearings 28 advantageously form means for radial anchoring of the blade in a radial hub shaft, which means form, with cooperating means of the radial shaft of a hub, a hub assembly according to the invention.

The shoulders 32 delimit a distal portion of the blade shank 12 which extends from the shoulders 32 radially towards the outside in the direction of the root pins 22, and a proximal portion which extends radially towards the inside from the shoulders 32 in the direction of the base 29 of the anchoring bush 23.

The blade shank assembly (root loops 21 and root pins 22) is in the distal portion of the blade shank, while the proximal assembly of the safety device (safety loop 26 and safety pin 27) is located in the proximal portion of the blade shank, close to the base 29 of the anchoring bush.

The shoulders 32 are advantageously redundant, so that one of them on its own is able to provide anchoring of the blade in a hub.

Accordingly, even in the event of rupture of the anchoring bush 23 in the zone situated between two shoulders 32, the most proximal shoulder 32, on the side of the base 29 of the anchoring bush, and the safety device will allow the blade to be retained in the hub. All the inertia of the blade is then taken up by the safety element 24, which is anchored radially relative to the hub by way of the most proximal shoulder 32 of the anchoring bush.

The invention can be the subject of many other variant embodiments which are not shown.

The invention can particularly advantageously be used in propeller blades that are not intended for aircraft, such as, for example, blades for wind-power engines, turbine blades, marine and submarine propeller blades, blades for terrestrial vehicles (for example hovercraft blades), etc. The invention extends further to types of motive power unit other than turboprop engines: for example turbofans with open rotors, with rotors with contra-rotating propellers, etc.

There is no reason why the hollow casing should not also have means for fixing in the anchoring bush. Likewise, there is no reason why another element that is not part of either the framework or the hollow casing but is connected to one of those two structures at least should not have means of fixing to the anchoring bush.

Other safety devices can be envisaged, for example shoulders opposite the framework and the anchoring bush, optionally spaced apart by a strictly positive clearance 30 during normal operation; in particular, the framework can have a spar which crosses an anchoring bush base and has a head at its end radially inside the base of the anchoring bush, in order to permit abutment on said base. Numerous other embodiments can be envisaged.

There is no reason why each of the elements of the blade should not be made of a material other than a composite material. Accordingly, the hollow casing, for example, which must withstand impacts with external objects, may be made of a metal or of a metal alloy.

Furthermore, the blade may be fixed in an anchoring bush or in a radial hub shaft by numerous blade shank assemblys other than root loops and root pins: for example, by screwing—the blade shank having a thread that cooperates with an internal thread of the anchoring bush (or of a radial shaft of a hub), by joining—the blade having a profile of the dovetailed, tapered type, etc., and the anchoring bush or the radial shaft having a cooperating housing, or the like.

In addition, the safety device, and in particular the safety loop, can be formed in any other element of the framework that is adapted to be able to retain the rotating blade—for example at the proximal end of a reinforcing spar 6, 7, thus forming a safety loop instead of a root loop.

In particular, the clearance 30 can be formed in the distal assembly of the safety element 24 with the framework, in addition to or instead of being formed at its proximal end. The clearance 30 can also be formed in the region of the arrangement of the safety pin 27 in the base 29 of the anchoring bush: the anchoring bush base then having cavities for the mounting of the safety pin 27 that have a larger diameter than the diameter of said safety pin 27.

In addition, the clearance 30 can be at least partially filled with an absorbing material such as, for example, an elastomer.

The security element 24 is not necessarily rigid and can be formed, for example, by a cable or a bundle of synthetic fibers.

A safety device as described in a blade according to the invention can also be mounted on existing blade models which do not originally provide a safety device.

Each cavity may advantageously be left empty (filled with air) or be filled with a lightweight material of the honeycomb material type, such as a non-structural polymer foam, or may even be filled with a fiber-reinforced structural material.

Furthermore, the connections 19 are not necessarily contiguous with the leading edge, so that a single forward cavity 17 is formed close to the leading edge.

In addition, the lengths of the structures inside the blade (reinforcing spars, safety framework, box spar) are described by way of example and depend largely on the geometric characteristics of the blade, which themselves depend on the application of the blade.

In addition, it is possible to add metal protecting elements, for example made of nickel or nickel-based alloy, (not shown) in the region of the leading edge of a blade according to the invention so as to protect the leading edge and locally enhance the impact resistance.

The invention claimed is:

1. A blade comprising an aerodynamic portion (31) and a blade shank (12) which is to be mounted in a hub according to a radial direction of said hub, said blade shank (12) comprising:
- a hub assembly (28, 32) which is capable of providing radial anchoring of the blade shank (12) relative to the hub,
- a blade shank assembly (21, 22) which is capable of providing fixing of the aerodynamic portion (31) to the blade shank (12),
- a safety device which is distinct from the blade shank assembly (21, 22) and comprises at least one safety element (24):
- which extends from a distal end (33), which is assembled to the aerodynamic portion by a distal assembly, to a proximal end (26), which is assembled to the blade shank (12) by a proximal assembly (26, 27),
- which is adapted to be able to provide radial anchoring of the aerodynamic portion (31) in the blade shank (12), wherein:
- the blade shank assembly (21, 22) is anchored to the blade shank (12) radially outside the hub assembly (28, 32),
- the proximal assembly (26, 27) is anchored to the blade shank (12) radially inside the hub assembly (28, 32), so that the safety element (24) is adapted to be able to prevent the blade from being released by providing radial anchoring of the blade in the event of rupture of the blade between the hub assembly (28, 32) and the distal assembly,
- at least one of the distal assembly and the proximal assembly (26, 27) has a strictly positive radial clearance (30), so that, under normal operating conditions of the blade, only the blade shank assembly (21, 22) provides radial anchoring of the aerodynamic portion (31) in the blade shank (12).

2. The blade as claimed in claim 1, wherein the distal assembly serves to join the safety element (24) to the aerodynamic portion (31) fixedly and without clearance.

3. The blade as claimed in claim 1, wherein the aerodynamic portion (31) comprises at least:
- a hollow casing (1) having an aerodynamic surface which is to exert a force in air, extending from the blade shank (12) to a free end (20) of the blade spanwise, and from a leading edge (2) to a trailing edge (3) chordwise,
- a framework:
- arranged in the hollow casing (1),
- comprising a plurality of soles (9a, 9b, 10a, 10b) which are in surface contact with the hollow casing (1) so as to provide structural support for the hollow casing (1).

4. The blade as claimed in claim 1, wherein the blade shank (12) comprises an anchoring bush (23) providing the hub assembly (28, 32) in cooperation with the hub, the blade shank assembly (21, 22) in cooperation with the aerodynamic portion (31), and the proximal assembly (26, 27) in cooperation with the safety element (24).

5. The blade as claimed in claim 4, wherein the anchoring bush (23) is adapted so that, once the blade has been mounted in the hub, the blade shank assembly (21, 22) is radially outside the hub.

6. The blade as claimed in claim 4, wherein the proximal assembly (26, 27) comprises at least:
- a safety loop (26) formed in the proximal end of the safety element (24),
- a safety pin (27):
- which passes through said safety loop (26), and
- which is spaced apart from the safety loop (26) by a strictly positive clearance (30) under normal operating conditions of the blade,
- ends of which are received in housings of the anchoring bush (23), said housings being anchored radially inside the hub assembly (28, 32).

7. The blade as claimed in claim 6, wherein the clearance (30) between the safety loop (26) and the safety pin (27) is filled with a material adapted to absorb relative vibrations of the safety loop relative to the safety pin.

8. The blade as claimed in claim 1, wherein at least one safety element (24) is a spar which extends at least partly in the aerodynamic portion (31) and into the blade shank (12).

9. The blade as claimed in claim 1, wherein:
the aerodynamic portion (31) comprises at least:
- a hollow casing (1) having an aerodynamic surface which is to exert a force in air, extending from the blade shank (12) to a free end (20) of the blade spanwise, and from a leading edge (2) to a trailing edge (3) in chordwise,
- a framework:
- arranged in the hollow casing (1),
- comprising a plurality of soles (9a, 9b, 10a, 10b) which are in surface contact with the hollow casing (1) so as to provide structural support for the hollow casing (1),
the proximal assembly (26, 27) comprises at least:
- a safety loop (26) formed in the proximal end of the safety element (24),
- a safety pin (27):
- which passes through said safety loop (26),
- which is spaced apart from the safety loop (26) by a strictly positive clearance (30) under normal operating conditions of the blade,
- ends of which are received in housings of the anchoring bush (23), said housings being anchored radially inside the hub assembly (28, 32),
the safety element (24) is a spar, the proximal end of which forms said safety loop (26).

10. The blade as claimed in claim 5, wherein the blade shank assembly (21, 22) comprises at least:
- a root loop (21) of the aerodynamic portion (31), which extends into the blade shank (12),
- a root pin (22) for the root loop (21), wherein the root pin (22):
- passes through said root loop (21),
- is mounted without clearance in said root loop (21),
- is fixedly assembled to the anchoring bush (23).

11. The blade as claimed in claim 10, wherein the distal assembly serves to join the safety element (24) to the aerodynamic portion (31) fixedly and without clearance, and
a framework comprises at least two spars, called reinforcing spars (6, 7), each:
- fixedly assembled in the aerodynamic portion (31),
- having at least one of said root loop (21) at its proximal end.

12. The blade as claimed in claim 11, wherein the safety element (24) and the reinforcing spars (6, 7) are made of composite material comprising at least a majority of fibers that are unidirectional spanwise.

13. A turboprop engine propeller comprising at least one blade as claimed in claim 1.

14. A turboprop engine comprising at least one propeller as claimed in claim 13.

15. An aircraft comprising at least one turboprop engine as claimed in claim 14.

16. The blade as claimed in claim 2, wherein the aerodynamic portion (31) comprises at least:
- a hollow casing (1) having an aerodynamic surface which is to exert a force in air, extending from the blade shank (12) to a free end (20) of the blade spanwise, and from a leading edge (2) to a trailing edge (3) chordwise, a framework:

arranged in the hollow casing (1), comprising a plurality of soles (9*a*, 9*b*, 10*a*, 10*b*) which are in surface contact with the hollow casing (1) so as to provide structural support for the hollow casing (1).

17. The blade as claimed in claim 2, wherein the blade shank (12) comprises an anchoring bush (23) providing the hub assembly (28, 32) in cooperation with the hub, the blade shank assembly (21, 22) in cooperation with the aerodynamic portion (31), and the proximal assembly (26, 27) in cooperation with the safety element (24).

18. The blade as claimed in claim 3, wherein the blade shank (12) comprises an anchoring bush (23) providing the hub assembly (28, 32) in cooperation with the hub, the blade shank assembly (21, 22) in cooperation with the aerodynamic portion (31), and the proximal assembly (26, 27) in cooperation with the safety element (24).

19. The blade as claimed in claim 5, wherein the proximal assembly (26, 27) comprises at least:

a safety loop (26) formed in the proximal end of the safety element (24), a safety pin (27):

which passes through said safety loop (26), and which is spaced apart from the safety loop (26) by a strictly positive clearance (30) under normal operating conditions of the blade, ends of which are received in housings of the anchoring bush (23), said housings being anchored radially inside the hub assembly (28, 32).

20. The blade as claimed in claim 19, wherein the clearance (30) between the safety loop (26) and the safety pin (27) is filled with a material adapted to absorb relative vibrations of the safety loop relative to the safety pin.

\* \* \* \* \*